(12) United States Patent
Hiratsuka

(10) Patent No.: US 12,503,883 B2
(45) Date of Patent: Dec. 23, 2025

(54) LOCKING DEVICE AND VEHICLE SEAT WITH LOCKING DEVICE

(71) Applicant: TS TECH CO., LTD., Asaka (JP)

(72) Inventor: Wataru Hiratsuka, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 61 days.

(21) Appl. No.: 18/360,358

(22) Filed: Jul. 27, 2023

(65) Prior Publication Data

US 2024/0035308 A1 Feb. 1, 2024

Related U.S. Application Data

(60) Provisional application No. 63/369,551, filed on Jul. 27, 2022.

(30) Foreign Application Priority Data

Jul. 26, 2023 (JP) .................................. 2023-121526

(51) Int. Cl.
  *E05B 47/00* (2006.01)
  *B60N 2/90* (2018.01)
  *B60N 2/20* (2006.01)

(52) U.S. Cl.
  CPC .......... *E05B 47/0012* (2013.01); *B60N 2/933* (2018.02); *B60N 2/20* (2013.01);
  (Continued)

(58) Field of Classification Search
  CPC ........... E05B 47/0012; E05B 2047/002; E05B 2047/0017; E05B 2047/0025; E05B 79/08; E05B 79/18; E05B 81/28; E05B 81/34; E05B 81/50; B60N 2/20; B60N 2/23; B60N 2/36; B60N 2/933; B60N 2002/952
  (Continued)

(56) References Cited

U.S. PATENT DOCUMENTS 5,537,848 A * 7/1996 Grzanka ................. E05B 77/28
  292/201
6,386,599 B1 * 5/2002 Chevalier ............... E05B 77/28
  292/201

(Continued)

FOREIGN PATENT DOCUMENTS

CN     219794974 U  * 10/2023
EP       1787857 A2 *  5/2007  .......... B60N 2/0232
WO  WO-2023172238 A1 *  9/2023  .......... E05B 17/188

*Primary Examiner* — Kristina R Fulton
*Assistant Examiner* — James Edward Ignaczewski
(74) *Attorney, Agent, or Firm* — Dority & Manning, P.A.

(57) ABSTRACT

A locking device includes a case, a latch, a locking member, an electric actuator, a rack, a guide portion, and a biasing member. The electric actuator includes a pinion. The rack meshes with the pinion and moves between a first position and a second position. The guide portion differentiates a going route and a return route. The going route is a route the rack takes when moving from the first position to the second position, and the return route is a route the rack takes when moving from the second position to the first position. When taking the going route, the rack meshes with the pinion and moves from the first position to the second position according to rotation of the pinion. When taking the return route, the rack moves toward the first position by a biasing force of the biasing member.

8 Claims, 13 Drawing Sheets

(52) U.S. Cl.
CPC . *B60N 2002/952* (2018.02); *E05B 2047/0017* (2013.01); *E05B 2047/002* (2013.01)

(58) Field of Classification Search
USPC ........................................................ 70/278.7
See application file for complete search history.

(56) References Cited

U.S. PATENT DOCUMENTS

| | | | | |
|---|---|---|---|---|
| 6,655,179 | B2* | 12/2003 | Kobayashi | E05B 77/28 |
| | | | | 70/279.1 |
| 7,234,737 | B2* | 6/2007 | Kalsi | E05B 81/25 |
| | | | | 292/216 |
| 9,546,503 | B2* | 1/2017 | Krueger | E05B 47/06 |
| 9,809,999 | B2* | 11/2017 | Weinerman | E05B 81/14 |
| 10,676,962 | B1* | 6/2020 | Weinerman | E05B 47/0001 |
| 10,682,932 | B2* | 6/2020 | Mosch | B60N 2/366 |
| 11,346,129 | B1* | 5/2022 | Weinerman | E05B 59/00 |
| 2002/0121786 | A1* | 9/2002 | Meinke | E05B 77/42 |
| | | | | 292/336.3 |
| 2002/0167178 | A1* | 11/2002 | Spurr | E05B 81/14 |
| | | | | 292/201 |
| 2018/0112443 | A1* | 4/2018 | Scocco | E05B 77/36 |
| 2022/0251878 | A1* | 8/2022 | Weinerman | E05B 47/0012 |

* cited by examiner

LOCKING DEVICE AND VEHICLE SEAT WITH LOCKING DEVICE

TECHNICAL FIELD

The present invention relates to a locking device and a vehicle seat with the locking device.

BACKGROUND ART

European Patent Application Publication No. 1787857 discloses a locking device for fixing a seat back, which is rotatable with respect to a vehicle body, to the vehicle body. The locking device includes a latch that engages with a striker, a locking member that keeps the latch in an engaging position, and an electric motor that rotates the locking member. The locking member rotates between a locking position to abut against the latch and a separating position to separate from the latch.

If the electric motor is driven even after the locking member, which is rotated by the electric motor, reaches the separating position, an excessive load may be applied to the electric motor.

SUMMARY OF THE INVENTION

In view of the above background, an object of the present invention is to provide a locking device that can suppress an excessive load on an electric motor. Further, another object of the present invention is to provide a vehicle seat with a locking device that can suppress an excessive load on an electric motor.

To achieve such an object, one aspect of the present invention provides a locking device (10) detachably coupled to a striker (8), comprising: a case (21) provided with a slot (45) into which the striker can protrude; a latch (22) supported by the case so as to rotate between an engaging position and a releasing position, the engaging position being a position where the latch protrudes into the slot and engages with the striker, the releasing position being a position where the latch retreats outside the slot; a locking member (23) supported by the case so as to rotate between a locking position and a separating position, the locking position being a position where the locking member engages with the latch in the engaging position and keeps the latch in the engaging position, the separating position being a position where the locking member separates from the latch; an electric actuator (24) supported by the case and including a pinion (24A) as an output portion; a rack (26) configured to mesh with the pinion, connected to the locking member via a first link (31), and configured to move between a first position and a second position; a guide portion (27) provided in the case, and configured to engage with the rack and thereby differentiate a going route and a return route, the going route being a route the rack takes when moving from the first position to the second position, the return route being a route the rack takes when moving from the second position to the first position; and a biasing member (33) configured to bias the rack to the first position, wherein the latch is in the engaging position when the rack is in the first position, and the latch is in the releasing position when the rack is in the second position, when taking the going route, the rack meshes with the pinion and moves from the first position to the second position according to rotation of the pinion, and when taking the return route, the rack moves toward the first position by a biasing force of the biasing member.

According to this aspect, the rack separates from the pinion upon reaching the second position, thereby preventing an excessive load from being applied to an electric motor. Thus, it is possible to provide a locking device that can suppress an excessive load on an electric motor.

In the above aspect, preferably, the guide portion is a looped guide groove (61) provided in the case, the rack includes a guide pin (62) configured to engage with the guide groove, the guide groove includes a first groove (61A) and a second groove (61B) extending parallel to each other along a first direction, a first connecting groove (61C) connecting a first end of the first groove and a first end of the second groove, and a second connecting groove (61D) connecting a second end of the first groove and a second end of the second groove, the second groove is arranged farther away from the pinion than the first groove, the first groove and the first connecting groove define the going route of the rack, and the second groove and the second connecting groove define the return route of the rack.

According to this aspect, the going route and the return route of the rack can be differentiated. Accordingly, the rack can separate from the pinion upon reaching the second position.

In the above aspect, preferably, the electric actuator includes an electric motor (24B) and a reduction device (24C), the latch, the locking member, the rack, the pinion, the guide portion, and the biasing member are provided on an inner surface of a base plate (21A) of the case, the electric motor and the reduction device are provided on an outer surface of the base plate of the case, and an output shaft (24D) of the reduction device penetrates through the base plate, and is coupled to the pinion.

According to this aspect, each element of the locking device can be arranged by using both surfaces of a sidewall of the case. Accordingly, the locking device can be made compact.

In the above aspect, preferably, a rotation axis of the pinion, a rotation axis of the locking member, and a rotation axis of the latch extend parallel to each other and are aligned in the first direction, and at least a portion of the electric actuator overlaps with the latch when viewed in a direction parallel to the rotation axis of the latch.

According to this aspect, the locking device can be made compact.

In the above aspect, preferably, the latch includes an abutting portion (22C) configured to protrude into the slot when the latch is in the releasing position, and the abutting portion is pushed by the striker, thereby the latch rotates from the releasing position to the engaging position.

According to this aspect, when the striker is pushed into the slot, the latch rotates from the releasing position to the engaging position, and thereby the latch engages with the striker (the striker is locked by the latch).

In the above aspect, preferably, a second link (32) is rotatably supported by the latch, the second link is provided with a connecting hole (32A), the locking member includes a connecting pin (23E) configured to protrude into the connecting hole, and when the locking member rotates from the locking position to the separating position, the connecting pin pushes an edge of the connecting hole, thereby allowing the latch to rotate from the engaging position to the releasing position.

According to this aspect, the locking member rotates from the locking position to the separating position, thereby the latch rotates from the engaging position to the releasing position.

In the above aspect, preferably, the locking member includes a ring (23D) arranged coaxially with the rotation axis of the locking member, and when the latch is in the engaging position and the locking member is in the locking position, the second link abuts against an outer circumferential surface of the ring, thereby restricting rotation of the latch toward the releasing position.

According to this aspect, the second link can surely keep the latch in the engaging position.

In the above aspect, preferably, the biasing member is a tension coil spring, and is connected to the rack and the second link and configured to bias the second link such that the second link abuts against the ring.

According to this aspect, the second link can be kept in a state of abutting against the ring.

In the above aspect, preferably, when the locking member rotates from the locking position to the separating position, the connecting pin pushes the edge of the connecting hole, thereby the second link rotates and separates from the ring.

According to this aspect, the driving force of the electric actuator is transmitted to the locking member via the pinion, the rack, and the first link, and the locking member rotates. Accordingly, the latch can rotate toward the releasing position.

Another object of the present invention is to provide a vehicle seat (1) comprising: the abovementioned locking device; and a seat back (4) configured to rotate with respect to a vehicle body, wherein the striker is provided on the vehicle body, and the locking device is provided on the seat back.

According to this aspect, it is possible to provide a vehicle seat with a locking device that can suppress an excessive load on an electric motor.

Effect of the Invention

To achieve such an object, one aspect of the present invention provides a locking device (10) detachably coupled to a striker (8), comprising: a case (21) provided with a slot (45) into which the striker can protrude; a latch (22) supported by the case so as to rotate between an engaging position and a releasing position, the engaging position being a position where the latch protrudes into the slot and engages with the striker, the releasing position being a position where the latch retreats outside the slot; a locking member (23) supported by the case so as to rotate between a locking position and a separating position, the locking position being a position where the locking member engages with the latch in the engaging position and keeps the latch in the engaging position, the separating position being a position where the locking member separates from the latch; an electric actuator (24) supported by the case and including a pinion (24A) as an output portion; a rack (26) configured to mesh with the pinion, connected to the locking member via a first link (31), and configured to move between a first position and a second position; a guide portion (27) provided in the case, and configured to engage with the rack and thereby differentiate a going route and a return route, the going route being a route the rack takes when moving from the first position to the second position, the return route being a route the rack takes when moving from the second position to the first position; and a biasing member (33) configured to bias the rack to the first position, wherein the latch is in the engaging position when the rack is in the first position, and the latch is in the releasing position when the rack is in the second position, when taking the going route, the rack meshes with the pinion and moves from the first position to the second position according to rotation of the pinion, and when taking the return route, the rack moves toward the first position by a biasing force of the biasing member.

According to this aspect, the rack separates from the pinion upon reaching the second position, thereby preventing an excessive load from being applied to an electric motor. Thus, it is possible to provide a locking device that can suppress an excessive load on an electric motor.

In the above aspect, preferably, the guide portion is a looped guide groove (61) provided in the case, the rack includes a guide pin (62) configured to engage with the guide groove, the guide groove includes a first groove (61A) and a second groove (61B) extending parallel to each other along a first direction, a first connecting groove (61C) connecting a first end of the first groove and a first end of the second groove, and a second connecting groove (61D) connecting a second end of the first groove and a second end of the second groove, the second groove is arranged farther away from the pinion than the first groove, the first groove and the first connecting groove define the going route of the rack, and the second groove and the second connecting groove define the return route of the rack.

According to this aspect, the going route and the return route of the rack can be differentiated. Accordingly, the rack can separate from the pinion upon reaching the second position.

In the above aspect, preferably, the electric actuator includes an electric motor (24B) and a reduction device (24C), the latch, the locking member, the rack, the pinion, the guide portion, and the biasing member are provided on an inner surface of a base plate (21A) of the case, the electric motor and the reduction device are provided on an outer surface of the base plate of the case, and an output shaft (24D) of the reduction device penetrates through the base plate, and is coupled to the pinion.

According to this aspect, each element of the locking device can be arranged by using both surfaces of a sidewall of the case. Accordingly, the locking device can be made compact.

In the above aspect, preferably, a rotation axis of the pinion, a rotation axis of the locking member, and a rotation axis of the latch extend parallel to each other and are aligned in the first direction, and at least a portion of the electric actuator overlaps with the latch when viewed in a direction parallel to the rotation axis of the latch.

According to this aspect, the locking device can be made compact.

In the above aspect, preferably, the latch includes an abutting portion (22C) configured to protrude into the slot when the latch is in the releasing position, and the abutting portion is pushed by the striker, thereby the latch rotates from the releasing position to the engaging position.

According to this aspect, when the striker is pushed into the slot, the latch rotates from the releasing position to the engaging position, and thereby the latch engages with the striker (the striker is locked by the latch).

In the above aspect, preferably, a second link (32) is rotatably supported by the latch, the second link is provided with a connecting hole (32A), the locking member includes a connecting pin (23E) configured to protrude into the connecting hole, and when the locking member rotates from the locking position to the separating position, the connecting pin pushes an edge of the connecting hole, thereby allowing the latch to rotate from the engaging position to the releasing position.

According to this aspect, the locking member rotates from the locking position to the separating position, thereby the latch rotates from the engaging position to the releasing position.

In the above aspect, preferably, the locking member includes a ring (23D) arranged coaxially with the rotation axis of the locking member, and when the latch is in the engaging position and the locking member is in the locking position, the second link abuts against an outer circumferential surface of the ring, thereby preventing the latch from rotating toward the releasing position.

According to this aspect, the second link can surely keep the latch in the engaging position.

In the above aspect, preferably, the biasing member is a tension coil spring, and is connected to the rack and the second link and configured to bias the second link such that the second link abuts against the ring.

According to this aspect, the second link can be kept in a state of abutting against the ring.

In the above aspect, preferably, when the locking member rotates from the locking position to the separating position, the connecting pin pushes the edge of the connecting hole, thereby the second link rotates and separates from the ring.

According to this aspect, the driving force of the electric actuator is transmitted to the locking member via the pinion, the rack, and the first link, and the locking member rotates. Accordingly, the latch can rotate toward the releasing position.

Another object of the present invention is to provide a vehicle seat (1) comprising: the abovementioned locking device; and a seat back (4) configured to rotate with respect to a vehicle body, wherein the striker is provided on the vehicle body, and the locking device is provided on the seat back.

According to this aspect, it is possible to provide a vehicle seat with a locking device that can suppress an excessive load on an electric motor.

BRIEF DESCRIPTION OF THE DRAWING(S)

DETAILED DESCRIPTION OF THE INVENTION

Hereinafter, an embodiment of a locking device and a vehicle seat with the locking device according to the present invention will be described with reference to the drawings. The seat may be a seat in a back row of a minivan (one-box car) or the like.

Figure 1:
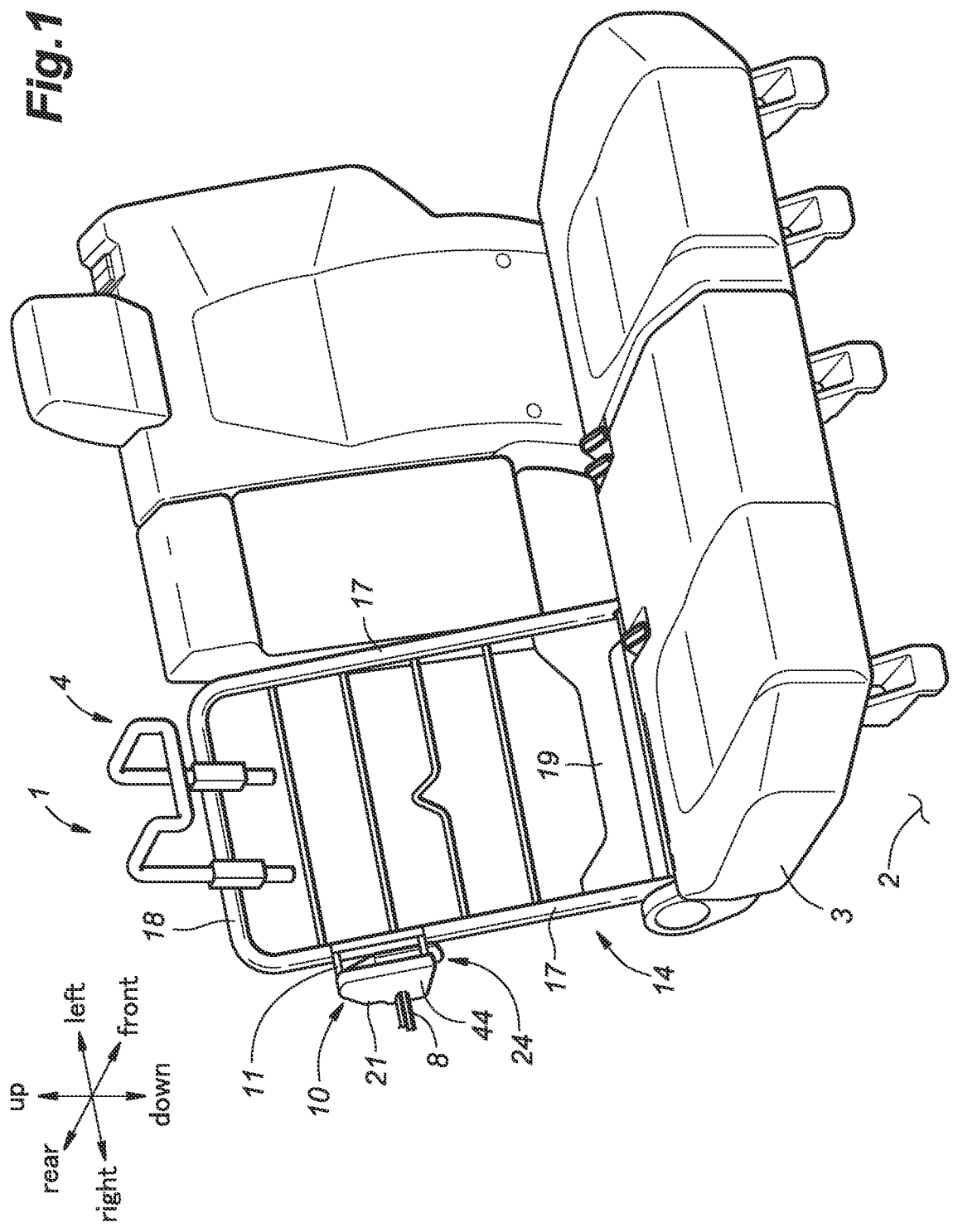
FIG. 1 is a perspective view of a seat according to an embodiment.

As shown in FIG. 1, the seat 1 includes a seat cushion 3 coupled to a floor 2, and a seat back 4 rotatably supported by a rear end of the seat cushion 3. The seat back 4 is supported by the rear end of the seat cushion 3 so as to rotate around an axis extending in the lateral direction.

The seat back 4 rotates between an in-use position where the seat back 4 extends upward from the rear end of the seat cushion 3 and a folded position where the seat back 4 extends forward from the rear end of the seat cushion 3 and is folded on the seat cushion 3.

A striker 8 is provided on a vehicle body, and a locking device 10 detachably coupled to the striker 8 is provided on the seat back 4. The locking device 10 is coupled to the striker 8, thereby the seat back 4 is kept in the in-use position. The striker 8 may be provided on each of the left and right sidewalls of the vehicle body. The striker 8 may include a bar-shaped portion extending laterally inward from the sidewall, and may be formed in a substantially U-shape.

The seat back 4 includes a seat back frame 14, a pad supported by the seat back frame 14, and a skin material provided on the pad. The seat back frame 14 includes left and right side members 17 extending in the up-and-down direction, an upper member 18 extending in the lateral direction and coupled to upper ends of the left and right side members 17, and a lower member 19 extending in the lateral direction and coupled to lower ends of the left and right side members 17.

The locking device 10 is coupled to one of the side members 17 of the seat back 4. The locking device 10 includes a case 21, a latch 22, a locking member 23, an electric actuator 24, a rack 26, a guide portion 27, a first link 31, a second link 32, and a biasing member 33.

The case 21 is formed in a hollow box-like shape. The case 21 extends along a first direction. The case 21 is coupled to one of the side members 17 of the seat back 4. The case 21 may be coupled to one of the side members 17 by a bracket 11. The electric actuator 24 may be coupled to an outer surface of the case 21. The electric actuator 24 may be arranged between the case 21 and one of the side members 17.

The first direction, which is an extending direction of the case 21, matches an extending direction of one of the side members 17. When the seat back 4 is in the in-use position, the first direction matches the up-and-down direction. Hereinafter, each direction of the locking device 10 will be described with reference to when the seat back 4 is in the in-use position.

Figure 2:
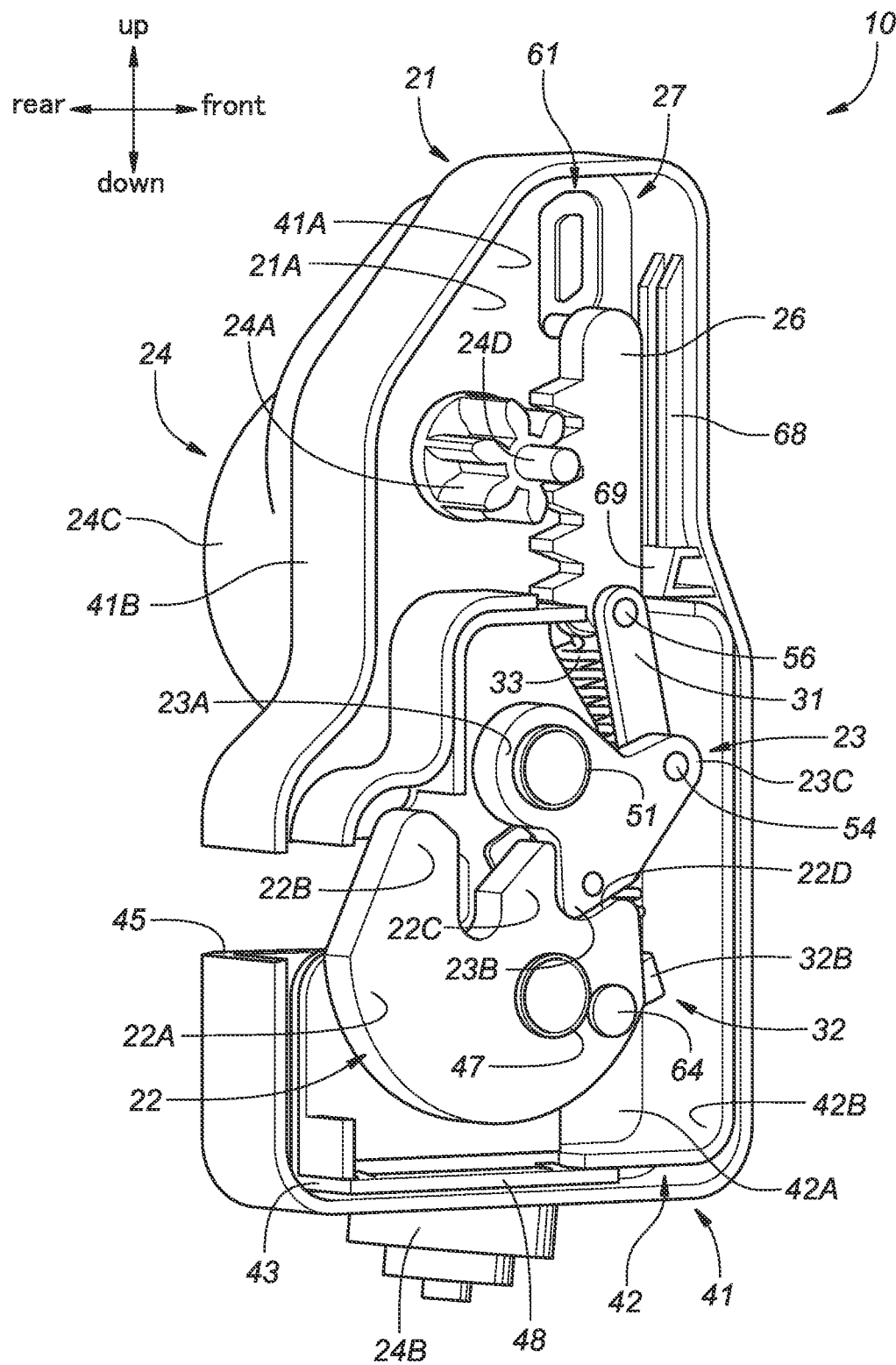
FIG. 2 is a perspective view of a locking device without a lid.
Figure 3:
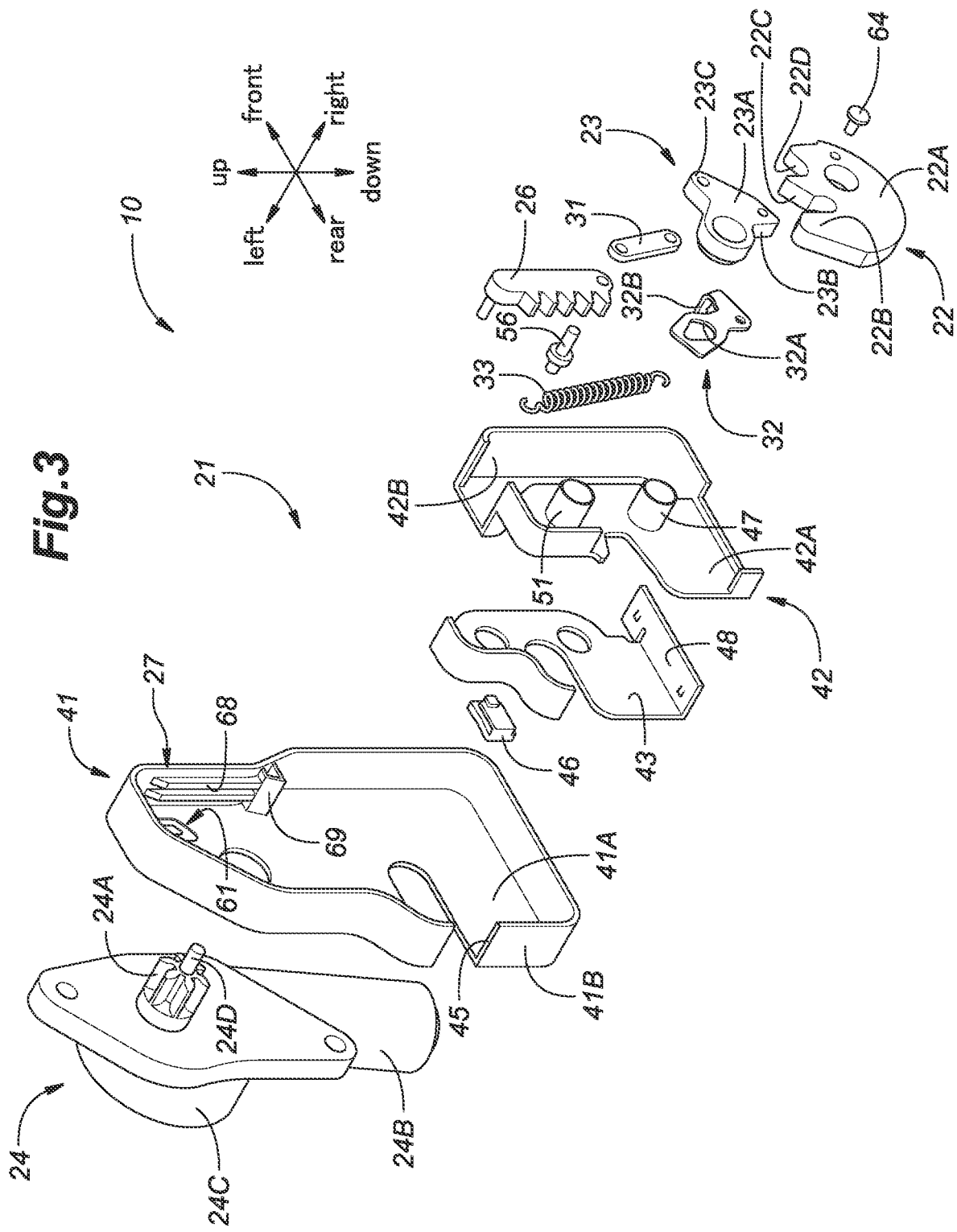
FIG. 3 is an exploded perspective view of the locking device.
Figure 4:
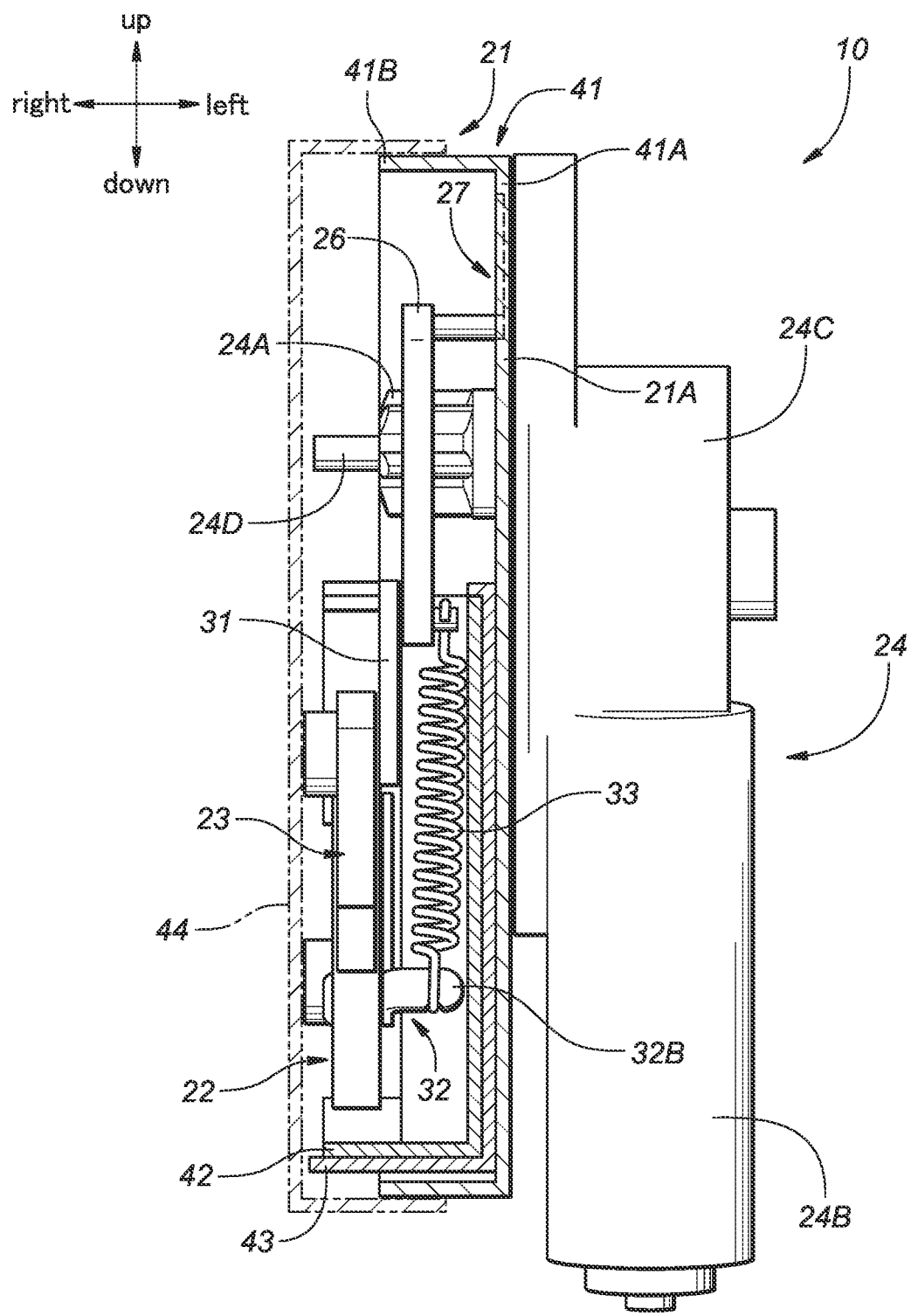
FIG. 4 is a vertical cross-sectional view of the locking device.

As shown in FIGS. 2 to 4, the case 21 may be formed by combining a plurality of members. In the present embodiment, the case 21 is composed of an outer shell 41, an inner shell 42, a reinforcement plate 43, and a lid 44. The outer shell 41 includes a plate-like first sidewall 41A extending in the first direction, and a first edge wall 41B provided on an edge of the first sidewall 41A. The inner shell 42 includes a plate-like second sidewall 42A, and a second edge wall 42B provided on an edge of the second sidewall 42A. The inner shell 42 is arranged inside the outer shell 41. The second sidewall 42A is coupled to the first sidewall 41A via the reinforcement plate 43. The outer shell 41 and the inner shell 42 may be made of resin. The reinforcement plate 43 may be made of metal. The first sidewall 41A, the reinforcement plate 43, and the second sidewall 42A are stacked together, and thereby forming a base plate 21A of the case 21. In another embodiment, the outer shell 41, the inner shell 42, and the reinforcement plate 43 may be formed by a single member. The lid 44 is coupled to the first edge wall 41B of the outer shell 41 so as to close an opening of the outer shell 41.

The case 21 is provided with a slot 45 into which the striker 8 can protrude. The slot 45 extends forward from a lower rear edge of the case 21, and penetrates through the case 21 in the lateral direction. The slot 45 is formed in the outer shell 41, the inner shell 42, the reinforcement plate 43, and the lid 44. The reinforcement plate 43 may define a portion of an edge of the slot 45. As shown in FIG. 3, a flexible damper 46 may be attached to a bottom of the slot 45. The damper 46 may be made of rubber or the like and attached to the reinforcement plate 43.

As shown in FIG. 2, the latch 22 is rotatably supported by the case 21. The latch 22 is arranged inside the case 21. The latch 22 is rotatably supported by a first pivot 47 provided on the case 21. The first pivot 47 is provided on the second sidewall 42A of the inner shell 42, and extends in the lateral direction. The first pivot 47 penetrates through the latch 22 in the lateral direction. The latch 22 rotates around the first pivot 47 extending in the lateral direction. The first pivot 47 may be arranged more downward and forward than the slot 45.

Figure 6:
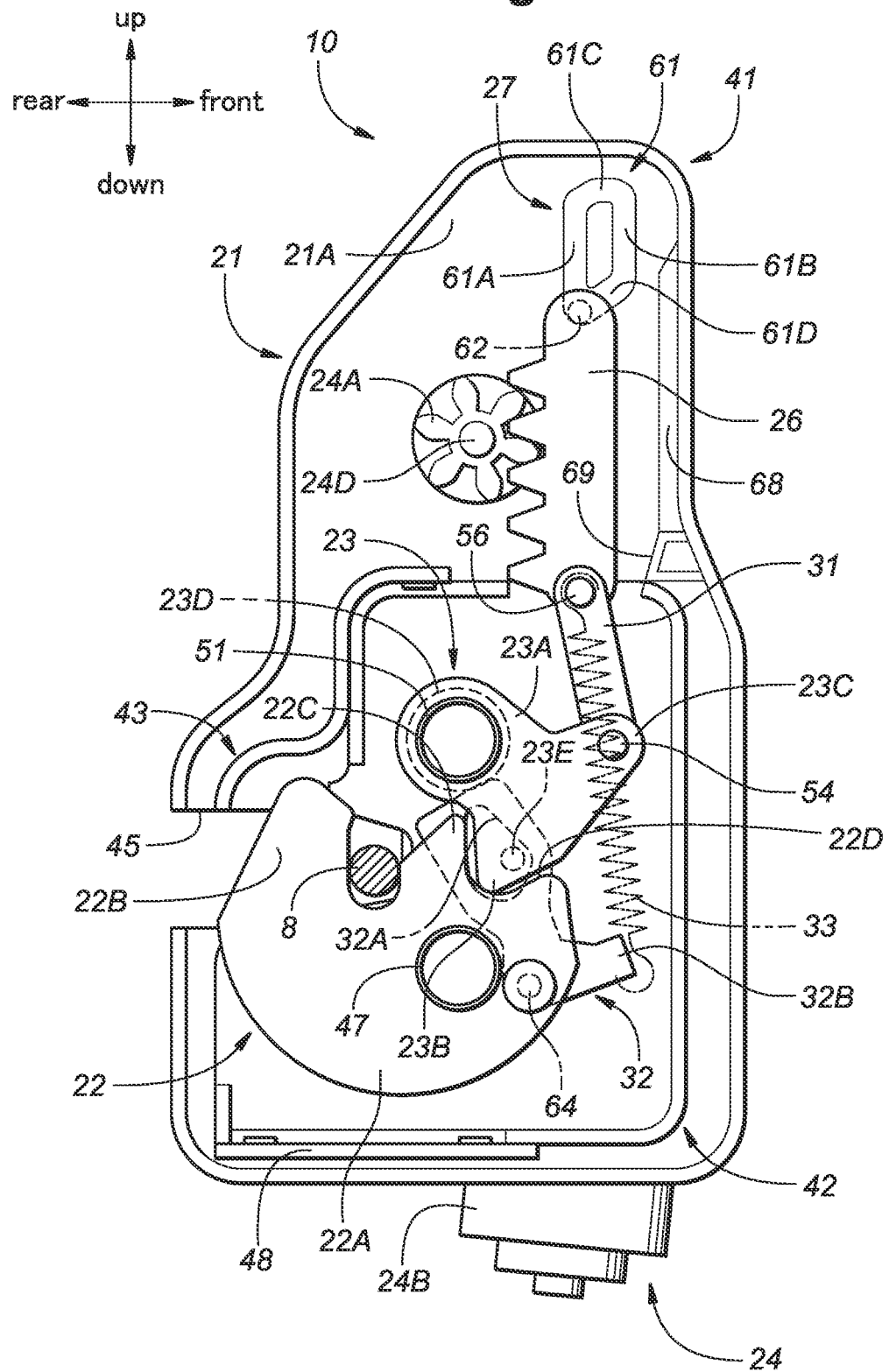
FIG. 6 is an explanatory diagram of the locking device in a locking state.
Figure 7:
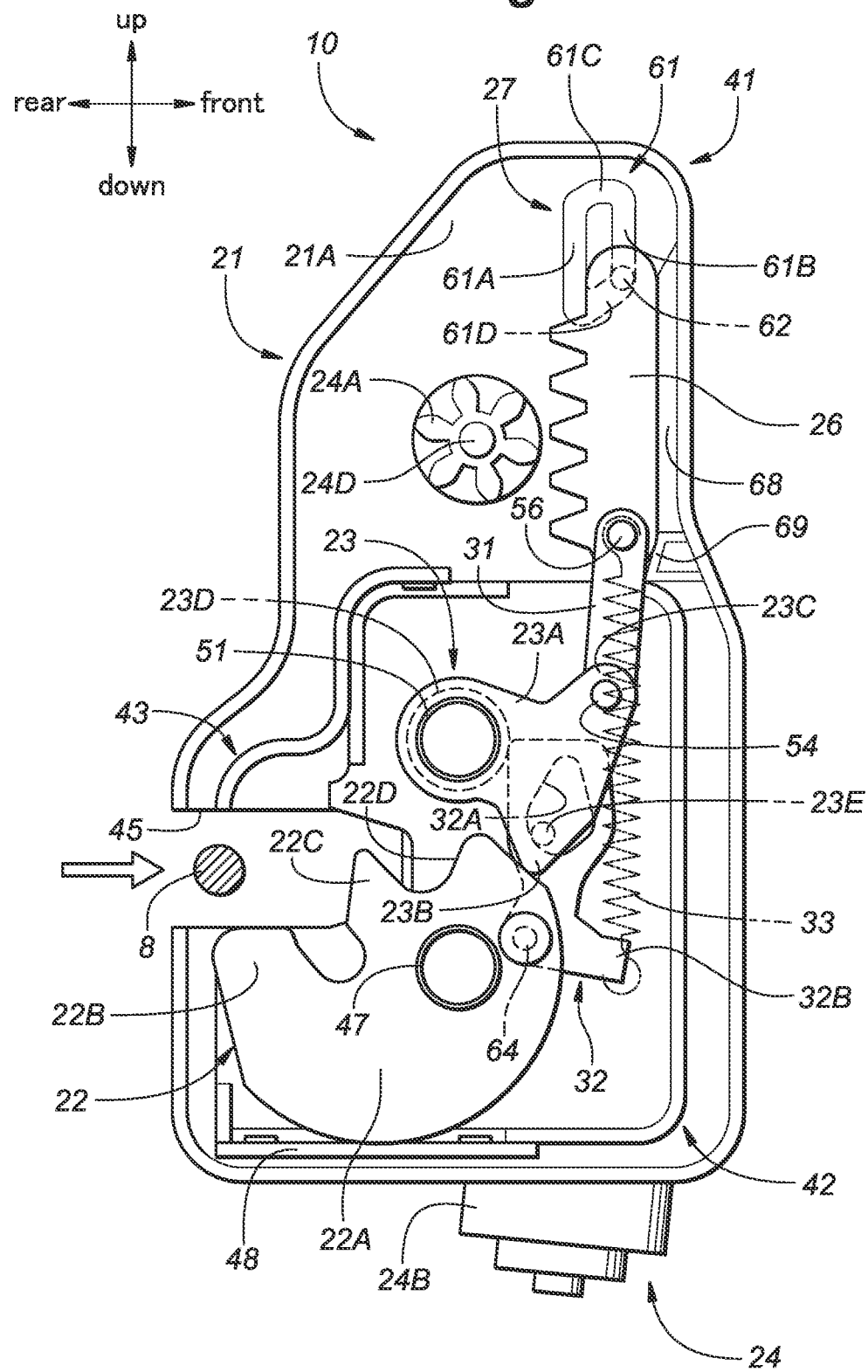
FIG. 7 is an explanatory diagram of the locking device in a releasing state.

As shown in FIGS. 6 and 7, the latch 22 is rotatable between an engaging position and a releasing position. The engaging position is a position where the latch 22 protrudes into the slot 45 and engages with the striker 8. The releasing position is a position where the latch 22 retreats outside the slot 45. The latch 22 includes a main body 22A formed of a plate perpendicular to the first pivot 47. An engaging claw 22B protruding outward is provided on an edge of the main body 22A. When the latch 22 is in the engaging position, the engaging claw 22B protrudes into the slot 45 and engages with the striker 8. As shown in FIG. 7, when the latch 22 is in the releasing position, the engaging claw 22B retreats outside the slot 45. When the latch 22 rotates from the releasing position to the engaging position, the engaging claw 22B moves upward and protrudes into the slot 45 from below. The latch 22 abuts against the case 21, thereby the releasing position of the latch 22 is determined. In the releasing position, the latch 22 may abut against a stopper 48 formed by the reinforcement plate 43.

The latch 22 includes an abutting portion 22C configured to protrude into the slot 45 when the latch 22 is in the releasing position. The abutting portion 22C protrudes outward from the edge of the main body 22A. The abutting portion 22C is provided with a cam surface configured to abut against the striker 8. When the latch 22 is in the releasing position, the cam surface inclines rearward toward an upper side. When the striker 8 pushes the cam surface forward, an upward force is applied to the abutting portion 22C and the latch 22 rotates from the releasing position to the engaging position. That is, the abutting portion 22C is pushed by the striker 8, thereby the latch 22 rotates from the releasing position to the engaging position. When viewed from the right, the latch 22 rotates clockwise around the first pivot 47 from the releasing position to the engaging position.

As shown in FIGS. 2 and 6, a locking groove 22D recessed toward the first pivot 47 is provided on the edge of the main body 22A of the latch 22. The locking groove 22D penetrates through the latch 22 in the lateral direction. The locking member 23 engages with the locking groove 22D. The locking groove 22D is arranged above the first pivot 47 when the latch 22 is in the engaging position.

The locking member 23 is rotatably supported by the case 21. The locking member 23 is arranged inside the case 21. The locking member 23 is rotatably supported by a second pivot 51 provided on the case 21. The second pivot 51 is provided on the second sidewall 42A of the inner shell 42, and extends in the lateral direction. The second pivot 51 penetrates through the locking member 23 in the lateral direction. The locking member 23 rotates around the second pivot 51 extending in the lateral direction. The second pivot 51 may be arranged more upward and forward than the slot 45. The second pivot 51 may be arranged above the first pivot 47.

As shown in FIGS. 6 and 7, the locking member 23 is configured to rotate between a locking position and a separating position. The locking position is a position where the locking member 23 engages with the latch 22 in the engaging position and keeps the latch 22 in the engaging position. The separating position is a position where the locking member 23 separates from the latch 22. When viewed from the right, the locking member 23 rotates counterclockwise around the second pivot 51, thereby moving from the locking position to the separating position.

The locking member 23 includes a main body 23A formed of a plate perpendicular to the second pivot 51. A first protrusion 23B and a second protrusion 23C are provided on an edge of the main body 23A. When the locking member 23 is in the locking position and the latch 22 is in the engaging position, the first protrusion 23B protrudes into the locking groove 22D and engages with (locks) the locking groove 22D. The second protrusion 23C is arranged more upward than the first protrusion 23B when the locking member 23 is in the locking position or the separating position. The second protrusion 23C is provided with a third pivot 54 extending in the lateral direction.

Figure 5:
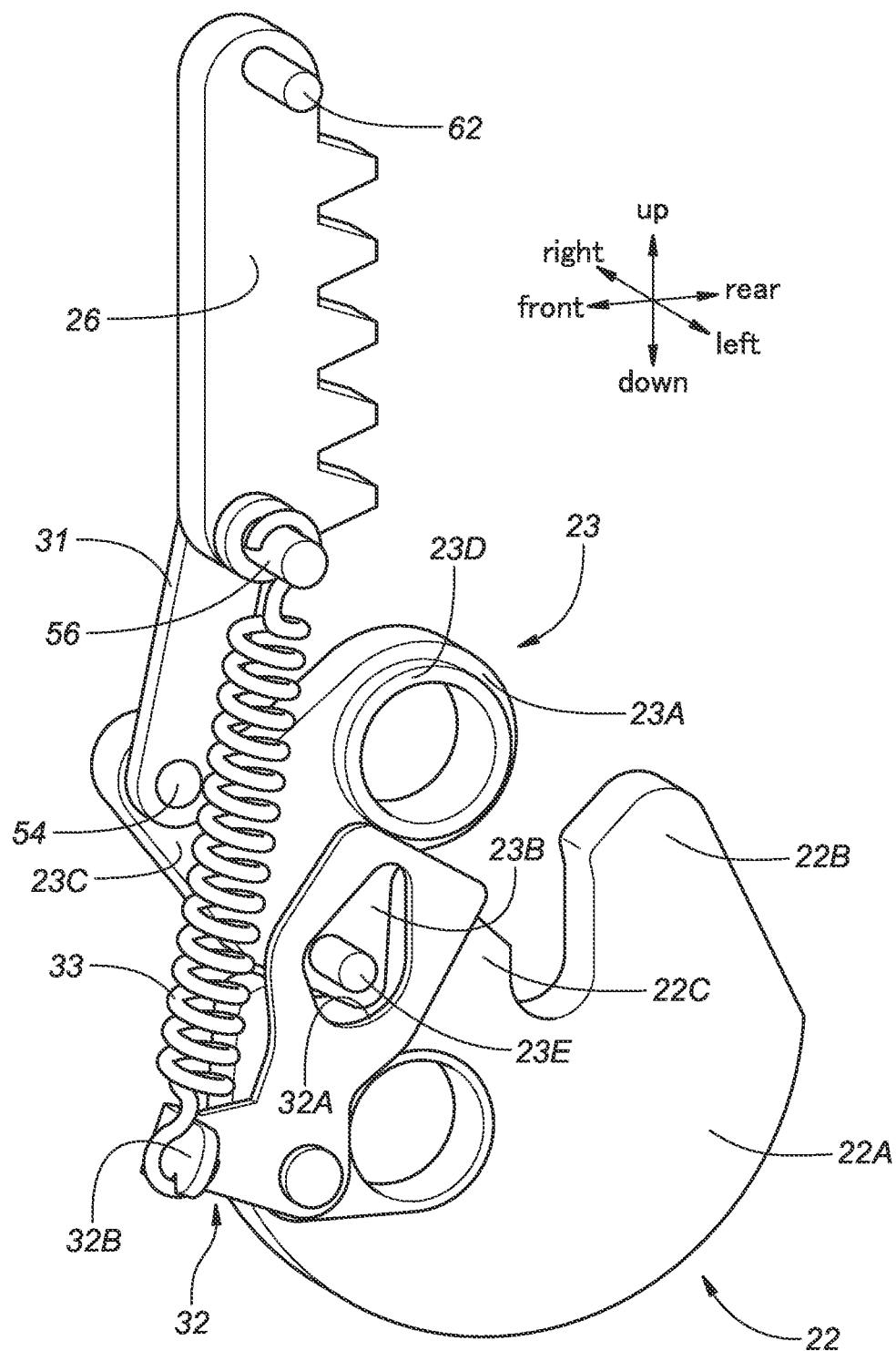
FIG. 5 is a perspective view showing a main portion of the locking device.

As shown in FIG. 5, the locking member 23 is provided with a ring 23D arranged coaxially with a rotation axis of the locking member 23. The ring 23D protrudes leftward from the main body 23A, and extends along an outer circumference of the second pivot 51. An inner circumferential surface of the ring 23D is in sliding contact with an outer circumferential surface of the second pivot 51.

As shown in FIGS. 2-4, the electric actuator 24 is supported by the case 21. The electric actuator 24 includes a pinion 24A as an output portion. The electric actuator 24 also includes an electric motor 24B and a reduction device 24C (reduction gear) that decelerates the rotation of the electric motor 24B. The electric motor 24B and the reduction device 24C are arranged outside the case 21. The electric motor 24B and the reduction device 24C may be formed integrally. The electric motor 24B and the reduction device 24C are provided on an outer surface of the case 21. The electric motor 24B and the reduction device 24C may be coupled to an outer surface of the first sidewall 41A of the outer shell 41.

An output shaft 24D of the reduction device 24C penetrates through the case 21, and is coupled to the pinion 24A. The output shaft 24D of the reduction device 24C may penetrate through the first sidewall 41A of the outer shell 41.

The pinion 24A is arranged inside the case 21. The pinion 24A rotates around an axis extending in the lateral direction. The pinion 24A may be arranged above the second pivot 51.

A rotation axis of the pinion 24A, the second pivot 51 as a rotation axis of the locking member 23, and the first pivot 47 as a rotation axis of the latch 22 extend parallel to each other, and are aligned in the up-and-down direction (first direction). The first pivot 47, the second pivot 51, and the pinion 24A may be arranged on a virtual line extending in the up-and-down direction. The pinion 24A may be arranged above the inner shell 42. At least a portion of the electric motor 24B may overlap with the latch 22 when viewed in a direction parallel to the rotation axis of the latch 22, namely, the lateral direction.

The rack 26 is configured to mesh with the pinion 24A, and is connected to the locking member 23 via the first link 31. The rack 26 extends in the up-and-down direction and is arranged in front of the pinion 24A. A fourth pivot 56 extending in the lateral direction is provided at a lower end of the rack 26. A lower end of the first link 31 is rotatably supported by the third pivot 54, and an upper end of the first link 31 is rotatably supported by the fourth pivot 56.

Figure 11:
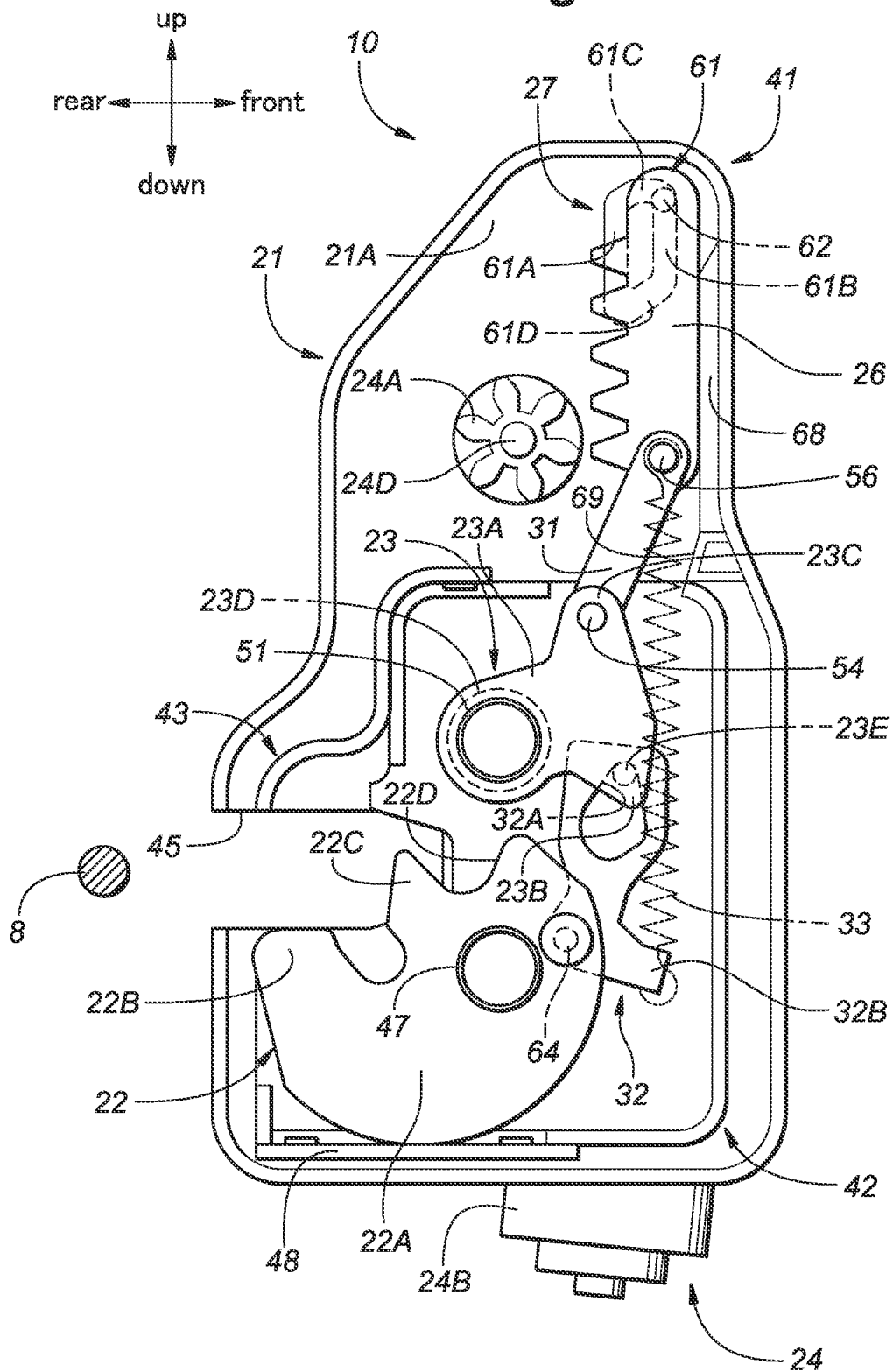
FIG. 11 is an explanatory diagram of the locking device in the process of changing from the locking state to the releasing state.

As shown in FIGS. 6 and 11, the rack 26 is configured to move between a first position and a second position. The second position is arranged higher than the first position. The guide portion 27 engages with the rack 26, thereby defining a movement route of the rack 26. The guide portion 27 is provided on the case 21. The guide portion 27 engages with the rack 26, thereby differentiating a going route and a return route. The going route is a route the rack 26 takes when moving from the first position to the second position. The return route is a route the rack 26 takes when moving from the second position to the first position.

The guide portion 27 is a looped guide groove 61 provided in the case 21. The guide groove 61 may be provided in an upper portion of an inner surface of the first sidewall 41A of the outer shell 41. The guide groove 61 may be arranged higher and more forward than the pinion 24A. The guide groove 61 is recessed leftward and opened rightward. The rack 26 is provided with a guide pin 62 configured to engage with the guide groove 61. The guide pin 62 protrudes leftward from an upper end of the rack 26, and protrudes into the guide groove 61.

The guide groove 61 includes a first groove 61A and a second groove 61B extending parallel to each other along the up-and-down direction (first direction), a first connecting groove 61C connecting an upper end (first end) of the first groove 61A and an upper end (first end) of the second groove 61B, and a second connecting groove 61D connecting a lower end (second end) of the first groove 61A and a lower end (second end) of the second groove 61B. The second groove 61B is arranged farther away from the pinion 24A than the first groove 61A. The second groove 61B is arranged in front of the first groove 61A.

The upper end of the first groove 61A and the upper end of the second groove 61B may be arranged at the same position with respect to the up-and-down direction. When viewed from the right, the first connecting groove 61C may be curved so as to protrude upward. The lower end of the first groove 61A is arranged lower than the lower end of the second groove 61B. The second connecting groove 61D inclines downward toward the rear. The first groove 61A and the first connecting groove 61C define the going route of the rack 26. The second groove 61B and the second connecting groove 61D define the return route of the rack 26.

As shown in FIG. 6, when the guide pin 62 is arranged at the lower end of the first groove 61A, the rack 26 is arranged in the first position. As shown in FIG. 11, when the guide pin 62 is arranged at the upper end of the second groove 61B, the rack 26 is arranged in the second position. When the rack 26 moves from the first position to the second position, the guide pin 62 passes through the going route of the rack 26. When the rack 26 moves from the second position to the first position, the guide pin 62 passes through the return route of the rack 26.

As shown in FIG. 6, when taking the going route, the rack 26 meshes with the pinion 24A. Accordingly, the rack 26 moves according to the rotation of the pinion 24A. By contrast, as shown in FIG. 7, when taking the return route, the rack 26 separates from the pinion 24A. Thus, even if the pinion 24A rotates, the rack 26 does not move.

As shown in FIG. 5, the second link 32 is rotatably supported by the latch 22. The main body 22A of the latch 22 is provided with a fifth pivot 64 protruding leftward. The fifth pivot 64 is arranged in front of the first pivot 47. The second link 32 is rotatably supported by the fifth pivot 64. The second link 32 is formed in a plate shape perpendicular to the fifth pivot 64. The second link 32 extends upward from the fifth pivot 64. The second link 32 is provided with a connecting hole 32A. The connecting hole 32A penetrates in the lateral direction. The connecting hole 32A extends in the up-and-down direction. A front-and-rear width of the connecting hole 32A decreases toward an upper end thereof. Further, the front-and-rear width of the connecting hole 32A decreases toward a lower end thereof. The second link 32 is arranged more leftward than the latch 22 and the locking member 23.

The locking member 23 is provided with a connecting pin 23E configured to protrude into the connecting hole 32A. The connecting pin 23E protrudes leftward from the main body 23A of the locking member 23. The latch 22 and the locking member 23 are connected via the second link 32.

The biasing member 33 is configured to bias the rack 26 to the first position. The biasing member 33 is a tension coil spring. The second link 32 is provided with an engaging portion 32B extending forward from the fifth pivot 64. The biasing member 33 is connected to the rack 26 and the second link 32. More specifically, the biasing member 33 is connected to the engaging portion 32B and the fourth pivot 56.

The biasing member 33 biases the second link 32 such that the second link 32 abuts against the ring 23D. When viewed from the right, the biasing member 33 is configured to pull the engaging portion 32B upward and thereby rotate the second link 32 counterclockwise around the fifth pivot 64. Thus, the second link 32 abuts against an outer circumferential surface of the ring 23D of the locking member 23.

As shown in FIG. 2, a first guide protrusion 68 and a second guide protrusion 69 are provided inside the case 21. The first guide protrusion 68 and the second guide protrusion 69 abut against a rear surface of the rack 26, thereby regulating the posture of the rack 26. The first guide protrusion 68 and the second guide protrusion 69 may be provided on the first edge wall 41B of the outer shell 41. The first guide protrusion 68 is arranged in front of the pinion 24A and extends in the up-and-down direction. The first guide protrusion 68 may be a rib configured to protrude rearward from the first edge wall 41B of the outer shell 41 and extending in the up-and-down direction. The second guide protrusion 69 is provided below the first guide protrusion 68. The second guide protrusion 69 may be connected to a lower end of the first guide protrusion 68. The second guide protrusion 69 protrudes more rearward than the first guide protrusion 68.

FIG. 6 shows a locking state (initial state) of the locking device 10. In the locking state, the rack 26 is in the first position. When the rack 26 is in the first position, the latch 22 is in the engaging position. Further, the locking member 23 is in the locking position, and the first protrusion 23B engages with the locking groove 22D. Further, an upper edge of the second link 32 abuts against the outer circumferential surface of the ring 23D of the locking member 23. The first protrusion 23B engages with the locking groove 22D, and the upper edge of the second link 32 abuts against the outer circumferential surface of the ring 23D of the locking member 23, thereby restricting the rotation of the latch 22 toward the releasing position. Further, the rack 26 meshes with the pinion 24A. In the locking state of the locking device 10, the striker 8 is arranged inside the slot 45 and engages with (locked by) the engaging claw 22B. Since the rotation of the latch 22 toward the releasing position is restricted, the striker 8 cannot separate from the slot 45.

FIG. 7 shows a releasing state of the locking device 10. In the releasing state, the latch 22 is in the releasing position and the abutting portion 22C protrudes into the slot 45. The latch 22 is biased by the biasing member 33 and kept in the releasing position. Further, the biasing member 33 biases the rack 26 to the first position. The locking member 23, which is connected to the rack 26 via the first link 31, is biased to the locking position. However, the connecting pin 23E of the locking member 23 abuts against a lower edge of the connecting hole 32A, thereby the locking member 23 is arranged in an intermediate portion between the separating position and the locking position. Thus, the rack 26 is arranged between the second position and the first position on the return route. In the releasing state of the locking device 10, the striker 8 can protrude into and separate from the slot 45.

Hereinafter, the process to change the locking device 10 from the locking state to the releasing state will be described. In order to change the locking device 10 from the locking state to the releasing state, the electric motor 24B rotates the preset number of times. The driving of the electric motor 24B may be started according to the switch operation by a user. The electric motor 24B is driven, thereby the pinion 24A rotates the prescribed number of times and counterclockwise when viewed from the right.

Figure 8:
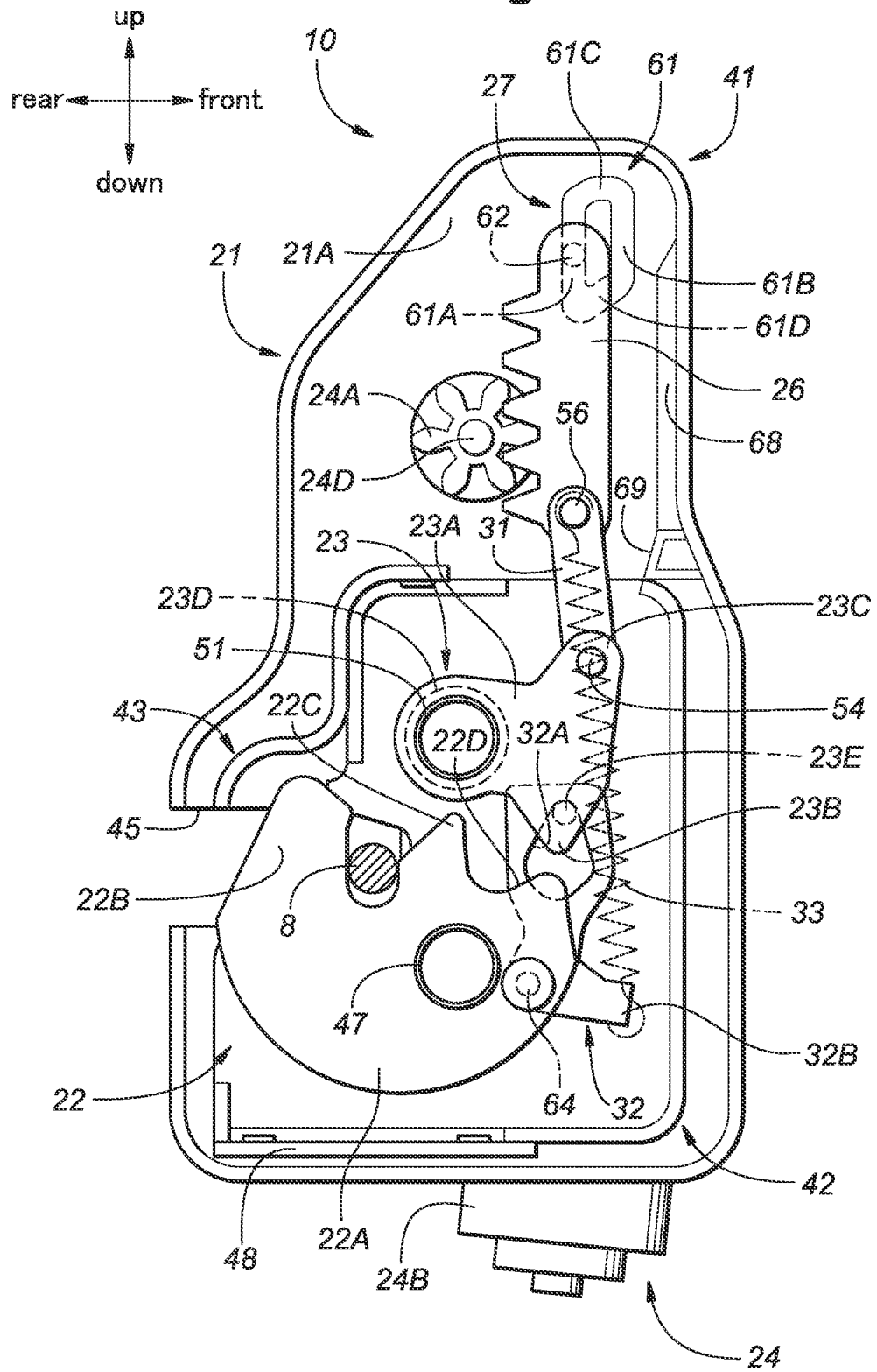
FIG. 8 is an explanatory diagram of the locking device in a process of changing from the locking state to the releasing state.

As shown in FIGS. 8 to 11, the rack 26 moves from the first position to the second position according to the rotation of the pinion 24A. More specifically, the pinion 24A rotates counterclockwise, thereby the rack 26 meshing with the pinion 24A moves from the first position to the second position on the going route. At this time, the guide pin 62 moves upward in the first groove 61A. The locking member 23 connected to the rack 26 via the first link 31 rotates from the locking position to the separating position. Accordingly, the first protrusion 23B of the locking member 23 separates from the locking groove 22D of the latch 22. At the same time, the connecting pin 23E provided on the locking member 23 pushes an edge of the connecting hole 32A upward and forward, thereby the second link 32 rotates clockwise, and the upper edge of the second link 32 separates from the outer circumferential surface of the ring 23D. Accordingly, the latch 22 can rotate from the engaging position to the releasing position. Accordingly, as shown in FIG. 8, the latch 22, which receives the biasing force of the biasing member 33, rotates from the engaging position to the releasing position. Thus, when the locking member 23 rotates from the locking position to the separating position, the connecting pin 23E pushes the edge of the connecting hole 32A, thereby allowing the latch 22 to rotate from the engaging position to the releasing position.

Figure 9:
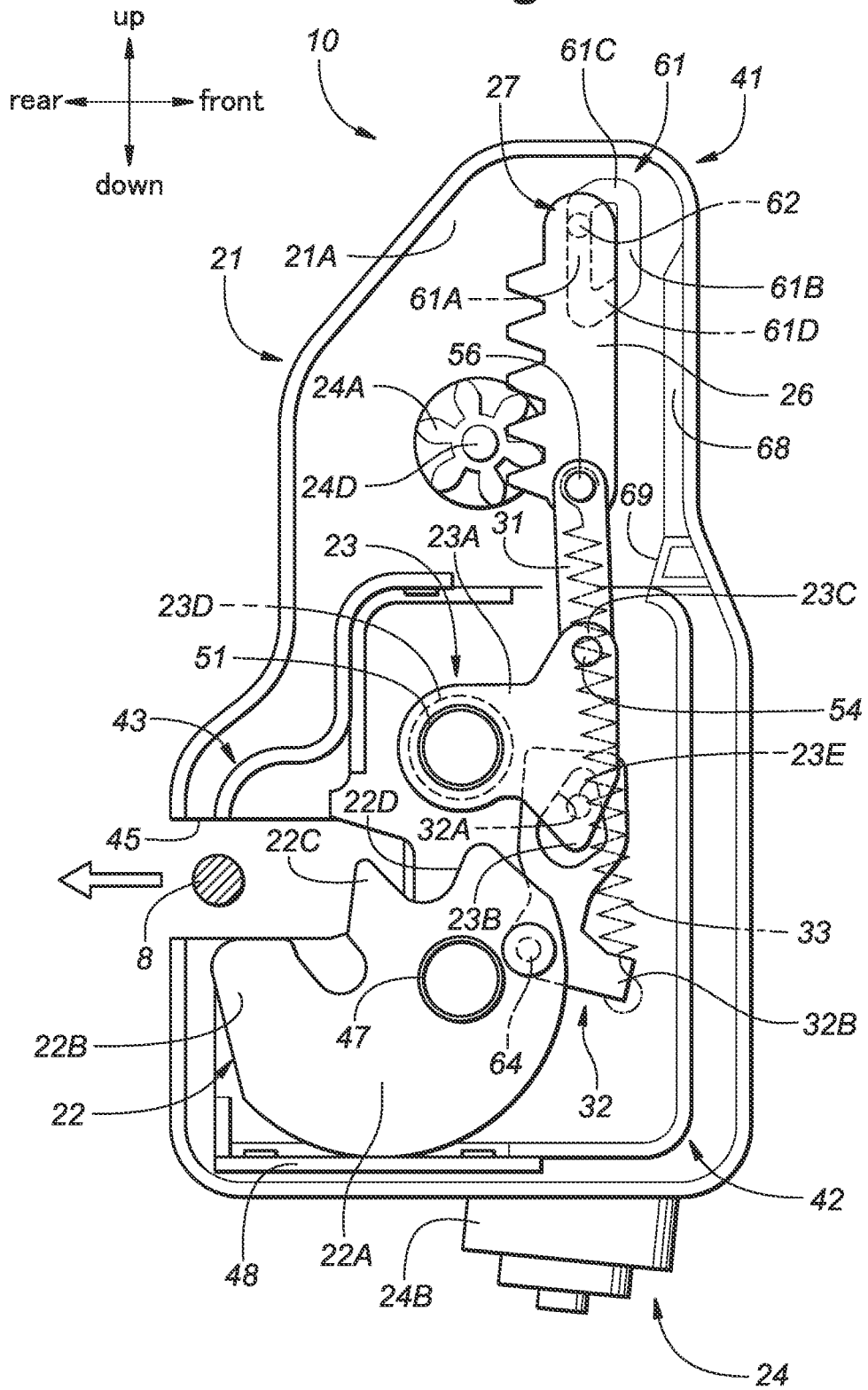
FIG. 9 is an explanatory diagram of the locking device in the process of changing from the locking state to the releasing state.
Figure 10:
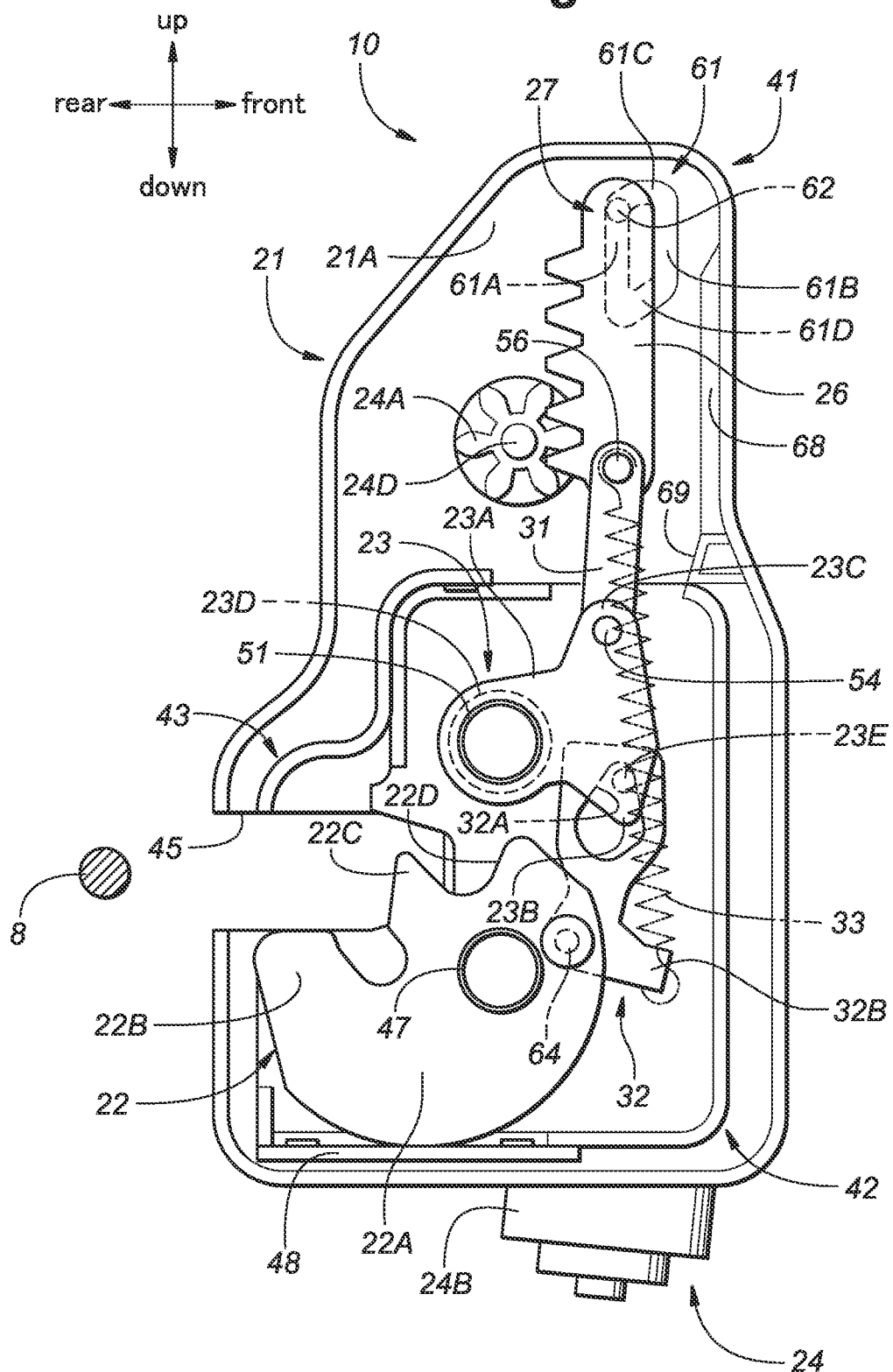
FIG. 10 is an explanatory diagram of the locking device in the process of changing from the locking state to the releasing state.

As shown in FIGS. 9 and 10, when the guide pin 62 reaches the upper end of the first groove 61A, namely, the rear end of the first connecting groove 61C, the upper end of the rack 26 can move forward. When the pinion 24A rotates in this state, as shown in FIG. 11, the rack 26 is pushed by the pinion 24A and the upper end of the rack 26 moves forward. At this time, the guide pin 62 moves forward in the first connecting groove 61C. As the guide pin 62 moves forward in the first connecting groove 61C, the pinion 24A and the rack 26 are gradually separated. When the guide pin 62 moves forward past the center of the first connecting groove 61C, the rack 26 completely separates from the pinion 24A. When the rack 26 separates from the pinion 24A, the rack 26 moves downward by the biasing force of the biasing member 33. That is, when taking the return route, the rack 26 moves toward the first position by the biasing force of the biasing member 33. At this time, the guide pin 62 moves forward and downward in a front portion of the first connecting groove 61C, and then moves downward in the second groove 61B. The downward movement of the rack 26 stops when the connecting pin 23E abuts against the lower edge of the connecting hole 32A. Accordingly, the locking device 10 turns into the releasing state shown in FIG. 7. The rotation number of times (driving amount) of the electric motor 24B is set such that at least the rack 26 can reach the second position. When the guide pin 62 moves downward in the second groove 61B, a ridge portion of the rack 26 comes into slide contact with the first guide protrusion 68, thereby the posture of the rack 26 is regulated.

The process to change the locking device 10 from the releasing state to the locking state will be described. When the striker 8 is inserted into the slot 45, the locking device 10 changes from the releasing state to the locking state. The user rotates the seat back 4 from the folded position to the in-use position, thereby the striker 8 can be inserted into the slot 45.

Figure 12:
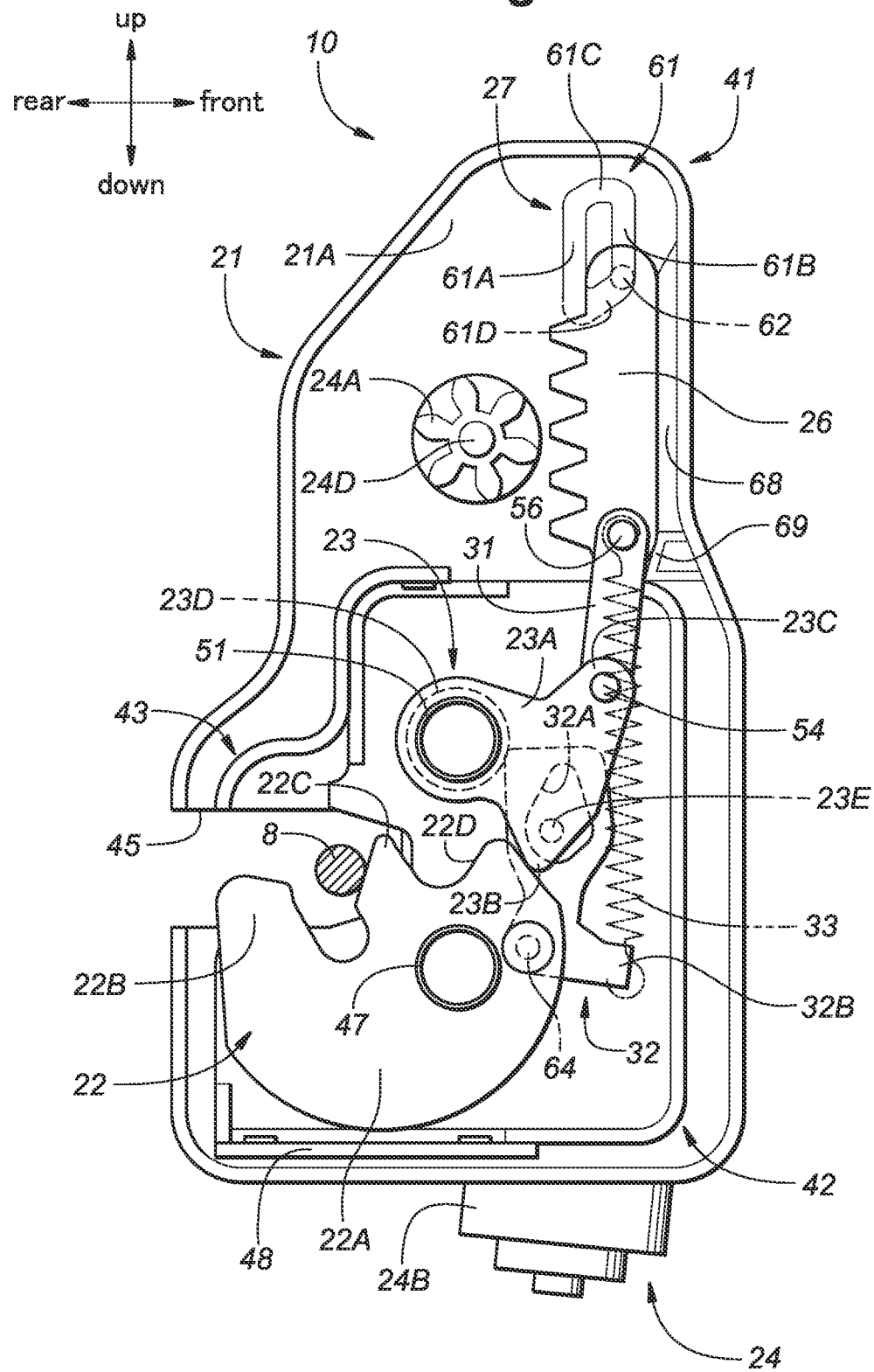
FIG. 12 is an explanatory diagram of the locking device in a process of changing from the releasing state to the locking state.

As shown in FIG. 12, the striker 8 inserted into the slot 45 pushes the abutting portion 22C (which protrudes into the slot 45) forward. Accordingly, the latch 22 rotates from the releasing position to the engaging position against the biasing force of the biasing member 33. At this time, the edge of the main body 22A of the latch 22 pushes an edge of the first protrusion 23B of the locking member 23 to slightly rotate the locking member 23 counterclockwise. Accordingly, the rack 26 moves slightly upward.

Figure 13:
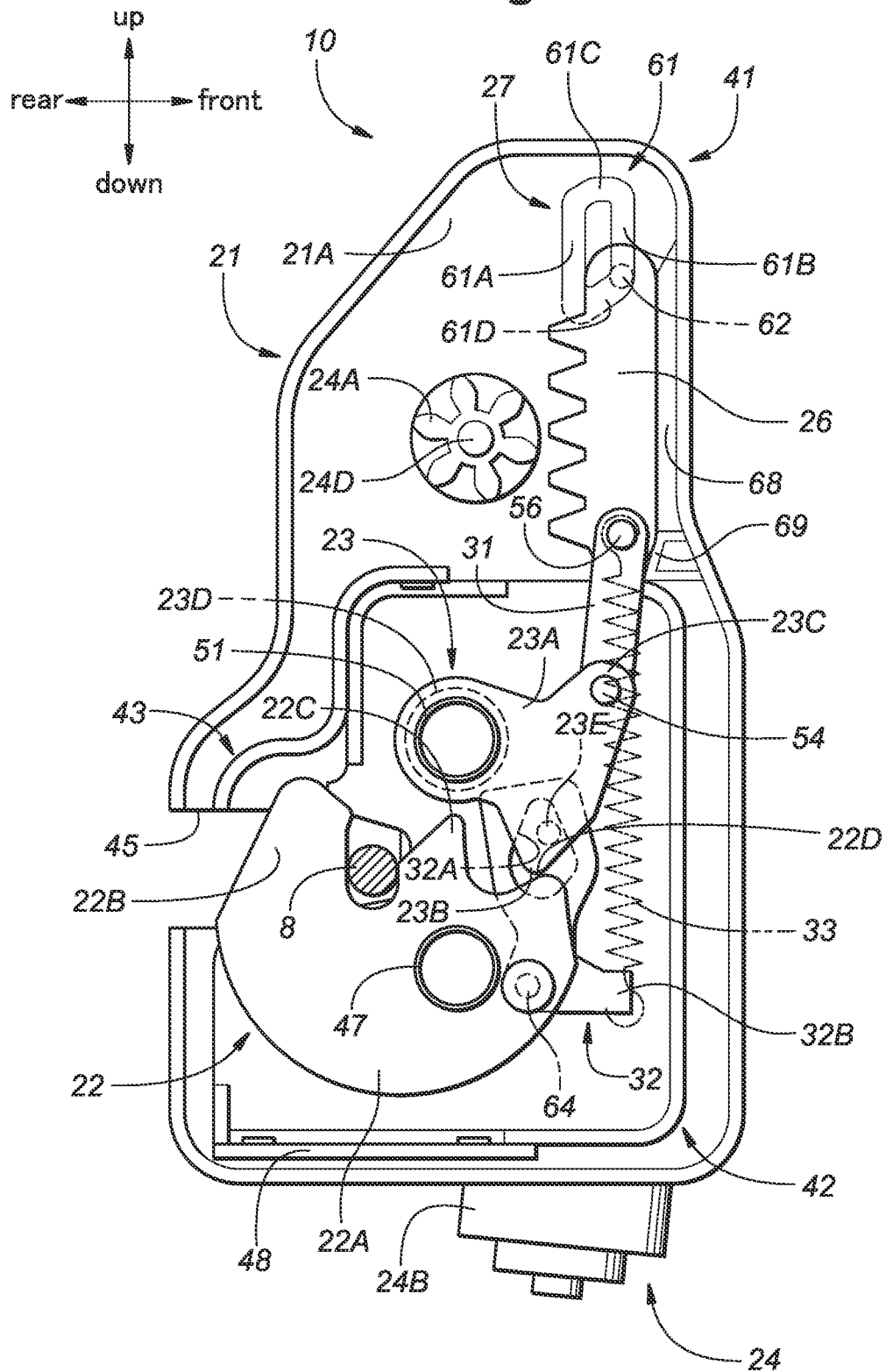
FIG. 13 is an explanatory diagram of the locking device in the process of changing from the releasing state to the locking state.

As shown in FIG. 13, when the latch 22 reaches the engaging position, the engaging claw 22B protrudes into the slot 45 and engages with (locks) the striker 8. Further, as biased by the biasing member 33, the second link 32 rotates counterclockwise, and the upper edge of the second link 32 abuts against the outer circumferential surface of the ring 23D of the locking member 23. At this time, the second link 32 moves downward according to the rotation of the latch 22 to the engaging position, thereby the connecting pin 23E separates upward from the lower edge of the connecting hole 32A. Accordingly, the locking member 23 can rotate to the locking position. In this state, as biased by the biasing member 33 and guided by the guide portion 27, the rack 26 moves to the first position. At this time, the guide pin 62 moves downward in the second groove 61B, and then moves downward and rearward in the second connecting groove 61D. Further, while the rack 26 is moving to the first position, the ridge portion of the rack 26 comes into slide contact with the second guide protrusion 69, thereby a lower portion of the rack 26 is guided rearward. As the second connecting groove 61D inclines rearward toward a lower side, the rack 26, which receives the biasing force of the biasing member 33, moves downward and rearward and reaches the first position. The locking member 23, which is connected to the rack 26 via the first link 31, rotates to the locking position as the rack 26 moves to the first position. Accordingly, the first protrusion 23B of the locking member 23 engages with the locking groove 22D of the latch 22. Consequently, the locking device 10 turns into the locking state shown in FIG. 6.

According to the locking device 10 of the embodiment, the rack 26 separates from the pinion 24A upon reaching the second position, thereby preventing an excessive load from being applied to the electric motor 24B. Thus, it is possible to provide the locking device 10 and the seat 1 with the locking device 10 that can suppress an excessive load on the electric motor 24B. Further, when the locking device 10 changes from the releasing state to the locking state, the rack 26 separates from the pinion 24A, and thereby the rotation resistance of the electric motor 24B is not applied to the movement of the rack 26. Accordingly, the resistance at the insertion of the striker 8 into the slot 45 is reduced, so that the rotating operation of the seat back 4 is facilitated. When the locking device 10 shifts from the locking state to the releasing state, the electric motor 24B may continue to rotate at least until the rack 26 moves to the second position.

The looped guide groove 61 can differentiate the going route and the return route of the rack 26. Accordingly, when the rack 26 reaches the second position, the rack 26 can separate from the pinion 24A.

The latch 22, the locking member 23, the rack 26, the pinion 24A, the guide portion 27, and the biasing member 33 are provided on an inner surface of the base plate 21A of the case 21, and the electric actuator 24 is provided on an outer surface of the base plate 21A. Accordingly, it is possible to arrange each element of the locking device 10 by using both surfaces of the base plate 21A of the case 21, so that the locking device 10 can be made compact. Further, at least a portion of the electric actuator 24 overlaps with the latch 22 when viewed in the lateral direction. Accordingly, the locking device 10 can be made more compact.

Concrete embodiments of the present invention have been described in the foregoing, but the present invention should not be limited by the foregoing embodiments and various modifications and alterations are possible within the scope of the present invention. For example, the orientation of the locking device 10 may be optionally changed depending on the position of the striker 8.

The invention claimed is:

1. A locking device detachably coupled to a striker, comprising:
a case provided with a slot into which the striker can protrude;
a latch supported by the case so as to rotate between an engaging position and a releasing position, the engaging position being a position where the latch protrudes into the slot and engages with the striker, the releasing position being a position where the latch retreats outside the slot;
a locking member supported by the case so as to rotate between a locking position and a separating position, the locking position being a position where the locking member engages with the latch in the engaging position and keeps the latch in the engaging position, the separating position being a position where the locking member separates from the latch;
an electric actuator supported by the case and including a pinion as an output portion;
a rack configured to mesh with the pinion, connected to the locking member via a first link, and configured to move between a first position and a second position;
a guide portion provided in the case, and configured to engage with the rack and thereby differentiate a going route and a return route, the going route being a route the rack takes when moving from the first position to the second position, the return route being a route the rack takes when moving from the second position to the first position; and
a biasing member configured to bias the rack to the first position,
wherein the electric actuator includes an electric motor and a reduction device,
the latch, the locking member, the rack, the pinion, the guide portion, and the biasing member are provided on an inner surface of a base plate of the case,
the electric motor and the reduction device are provided on an outer surface of the base plate of the case, and
an output shaft of the reduction device penetrates through the base plate, and is coupled to the pinion.

2. The locking device according to claim 1, wherein a rotation axis of the pinion, a rotation axis of the locking member, and a rotation axis of the latch extend parallel to each other and are aligned in the first direction, and
at least a portion of the electric actuator overlaps with the latch when viewed in a direction parallel to the rotation axis of the latch.

3. The locking device according to claim 2, wherein the latch includes an abutting portion configured to protrude into the slot when the latch is in the releasing position, and
the abutting portion is pushed by the striker, thereby the latch rotates from the releasing position to the engaging position.

4. The locking device according to claim 3, wherein a second link is rotatably supported by the latch,
the second link is provided with a connecting hole,
the locking member includes a connecting pin configured to protrude into the connecting hole, and
when the locking member rotates from the locking position to the separating position, the connecting pin pushes an edge of the connecting hole, thereby allowing the latch to rotate from the engaging position to the releasing position.

5. The locking device according to claim 4, wherein the locking member includes a ring arranged coaxially with the rotation axis of the locking member, and
when the latch is in the engaging position and the locking member is in the locking position, the second link abuts against an outer circumferential surface of the ring, thereby restricting rotation of the latch toward the releasing position.

6. The locking device according to claim 5, wherein the biasing member is a tension coil spring, and is connected to the rack and the second link and configured to bias the second link such that the second link abuts against the ring.

7. The locking device according to claim 6, wherein when the locking member rotates from the locking position to the separating position, the connecting pin pushes the edge of the connecting hole, thereby the second link rotates and separates from the ring.

8. A vehicle seat, comprising:
a locking device according to claim 1;
a seat cushion; and a seat back rotatably supported by a rear end of the seat cushion,
wherein the seat back includes a seat back frame, a pad supported by the seat back frame, and a skin material provided on the pad,
the striker is provided on the vehicle body, and
the locking device is provided on the seat back.

* * * * *